United States Patent
Lee

(10) Patent No.: US 6,509,717 B2
(45) Date of Patent: Jan. 21, 2003

(54) SMART BATTERY, SECONDARY SMART BATTERY CONNECTION APPARATUS OF PORTABLE COMPUTER SYSTEM, AC ADAPTER IMPLEMENTING SAME, AND CONNECTION METHOD THEREOF

(75) Inventor: Chan Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/912,488

(22) Filed: Jul. 26, 2001

(65) Prior Publication Data

US 2002/0011823 A1 Jan. 31, 2002

(30) Foreign Application Priority Data

Jul. 28, 2000 (KR) .......................... 2000-43798

(51) Int. Cl.[7] ............................................. H01M 10/46
(52) U.S. Cl. ..................................................... 320/116
(58) Field of Search .................................. 320/107, 110, 320/116, 112

(56) References Cited

U.S. PATENT DOCUMENTS 5,621,301 A * 4/1997 Allen et al. ............ 320/112 X

* cited by examiner

Primary Examiner—Edward H. Tso
(74) Attorney, Agent, or Firm—Fleshner & Kim, LLP

(57) ABSTRACT

An smart battery apparatus for connecting a smart battery to a portable computer system includes a primary smart battery and a secondary smart battery, each having a first connector and a second connector installed at an exterior for connecting the secondary smart battery to the primary smart battery. A smart battery selecting unit is also included for selecting the primary smart battery or the secondary smart battery and controlling the selected battery so as to supply power to a portable computer system. A system power supply unit supplies the power selected by the smart battery selecting unit and appropriate power for operating the system. A SM BUS (System Management Bus) host is checking operation states or operation information of both smart batteries and requesting a charge state of each smart battery. An AC/DC adapter receives AC power from an AC power source and outputs DC power, and a charging unit receives the DC power from the AC/DC adapter and supplies power to change the primary smart battery or the secondary smart battery.

32 Claims, 8 Drawing Sheets

SMART BATTERY, SECONDARY SMART BATTERY CONNECTION APPARATUS OF PORTABLE COMPUTER SYSTEM, AC ADAPTER IMPLEMENTING SAME, AND CONNECTION METHOD THEREOF

BACKGROUND OF THE INVENTION

1. Field of the Invention

The present invention relates to a battery connection apparatus of a portable computer system, and in particular to a secondary smart battery connection apparatus of a portable computer and a connection method thereof which are capable of connecting a secondary smart battery to a primary smart battery without using any additional equipment or changing the structure of a portable computer system.

2. Description of the Prior Art

As used herein, the terms "primary" and "primary smart battery" and "secondary" and "secondary smart battery" refer to batteries intended for use with portable battery-powered devices such as portable computer systems, often called "notebook" computers, which conform with the industry specifications for so-called "smart batteries", as specified in the following specifications, which are incorporated herein by reference made thereto:

"Smart Battery System (SBS), Specifications", collectively comprised of:
"Smart Battery Data Specifications", Revision 1.1. SBS-Implementers Forum, December 1998;
"Smart Battery Charger Specification", Revision 1.1, SBS-Implementers Forum December 1998;
"Smart Battery System Manager Specification", Revision 1.1, SBS-Implementers Forum, December 1998;
"System Management Bus Specification", Revision 1.0, SBS-Implementers Forum, December 1998; and
"System Management Bus BIOS Interface Specification", Revision 1.0, Feb. 15, 1995.

The above-listed specifications are available on the Internet via http://www.sbs-forum.org/specs/index.html and http://www.smbus.org/specs/.

Basically, the primary/secondary designation refers to smart batteries which contain internal discharge control mechanisms (e.g. blocking diodes and/or FET switches) to allow multiple batteries to be connected in parallel, and which of the batteries in a multiple battery is acting as a primary or secondary battery. This is not to be confused with the use of "primary" and "secondary" in reference to non-rechargeable and rechargeable type batteries, respectively, in that the smart batteries described herein are rechargeable type batteries.

In general, in supplying power to a portable computer system, a portable computer system is supplied with DC power by an AC adapter receiving AC power from an external power source, or is supplied power from a main primary smart battery without having any power supplied externally or is supplied power from the main primary smart battery and a secondary smart battery in case of continuous use for a long time.

In addition, in a signal control unit for supplying power to the portable computer system, a battery control microcomputer reads state information of a primary smart battery according to its discharge state and notifies it to a user through a System Management BUS (SM BUS) (i.e., the SM BUS is capable of transmitting optimum data by being constructed with a clock (SCL) and date (SDA), the user judges whether it is necessary to exchange the primary smart battery for a secondary smart battery and continues the operation of the system in accordance with the state information of the primary smart battery of the system. Accordingly, the user is less sensitive to a necessity of an adapter using AC power in use of the portable computer system at away from a source of AC power.

FIG. 1 illustrates changing a smart battery by a so-called "hot plugging" or "hot swapping" method in accordance with the prior art. As depicted in FIG. 1, a system can be operated by removing a presently installed storage module (i.e., a detachable floppy disc drive or a CD-ROM drive, etc.) from a portable computer system and inserting a secondary smart battery into the system by the conventional hot plugging method.

FIG. 2 is a block diagram illustrating a method for using a secondary smart battery in the conventional portable computer system. As depicted in FIG. 2, in a portable computer system being supplied power from a primary or a secondary smart battery, the portable computer system includes a smart battery selecting unit 5 selecting a primary smart battery 3 or a secondary smart battery 4 in the system, a system power supplying unit 1 being supplied power from the primary smart battery 3 selected by the smart battery selecting unit 5 and outputting power for operating the system, a System Management BUS (SM BUS) host 2 checking an operation state or operation information of the smart batteries 3, 4 through the SM BUS and requesting a charging of the smart batteries 3, 4, an AC/DC adapter 6 being supplied AC power from a power source and outputting DC power to the system, and a charger unit 7 being supplied DC power from the AC/DC adapter 6 and supplying charging power to the secondary smart battery.

The operation for supplying power to the conventional portable computer system will now be described.

First, when the portable computer system is being powered by the primary smart battery 3, in order to use the secondary smart battery 4 in the portable computer system, the secondary smart battery 4 is inserted into the portable computer system after removing a storage module (not shown) from the portable computer or a secondary bay module (not shown) is installed in the portable computer system and the secondary smart battery 4 is connected to the secondary bay module 4.

After that, when a remaining capacity of the primary smart battery 3 installed in the portable computer system reaches the limit and a rated voltage is not outputted from it, the smart battery selecting unit 5 switches a power source connection from the primary smart battery 3 used as a power supplier in the portable computer system to the secondary smart battery 4 in order for the secondary smart battery 4 to supply power to the portable computer system.

Herein, when the user wants to charge the primary smart battery 3 while the portable computer system is being powered by the secondary smart battery 4 in accordance with the switching operation of the smart battery selecting unit 5, the charger unit 7 of the portable computer system is supplied DC power from the AC/DC adapter 6 and charges the primary smart battery 3. Similarly, when the portable computer system is being by the primary smart battery 3, the charger unit 7 of the portable computer system charges the secondary smart battery 4 after a battery selection operation of the smart battery selecting unit 5.

However, in the secondary battery connection apparatus of the portable computer system in accordance with the prior art, when the user directly changes a battery, a powering-off and re-booting of the portable computer system has to be performed after ending a present system operation, when a secondary smart battery is to be used by the hot plugging method in operation of the system, and a storage module has to be removed in order to insert the secondary smart battery. Accordingly, if the user wishes to continue using the storage module, there is a limitation in use. And, when the secondary smart battery is connected to the portable computer system through a docking station (i.e., an apparatus for indirectly combining the storage module with the portable computer system when the storage module can not be directly combined with the portable computer system due to a thin thickness of the portable computer system) or a port replicator, the user has to additionally buy a second bay module such as the docking station or the port replicator and carry it always in use of the portable computer system.

SUMMARY OF THE INVENTION

It is an object of the present invention to provide a secondary battery connection apparatus for a portable computer system and a connection method thereof which are capable of not requiring a change in functions of a presently operating portable computer system when installing a secondary smart battery and not causing any inconveniences to users such as requiring a storage module change, by directly connecting a secondary smart battery to a primary smart battery.

It is another object of the present invention to provide a secondary battery connection apparatus for a portable computer system and a connection method thereof which are capable of not requiring a change in functions of a presently operating portable computer system and facilitating using the portable computer system without requiring buying and carrying additional optional equipment such as a docking station or a port replicator, etc., by directly combining a secondary smart battery with an exterior connector of a primary smart battery.

It is still another object of the present invention to provide an apparatus and a method for supplying power inside a system by providing a smart battery inside an AC/DC adapter.

In order to achieve the above-mentioned objects, there is provided a secondary battery connection apparatus of a portable computer system including a primary smart battery and a secondary smart battery separately having a first connector and a second connector installed at its exterior for connecting the secondary smart battery to the primary smart battery, a smart battery selecting unit selecting the primary smart battery or the secondary smart battery and controlling the selected battery so as to supply power to a portable computer system, a system power supplying unit being supplied the power selected by the smart battery selecting unit and supplying power appropriate for operating the system, a System Management BUS (SM BUS) host checking operation states or operation information of both smart batteries and requesting a charge of each smart battery, an AC/DC adapter being supplied AC power from a power source and outputting DC power, and a charging unit being supplied the DC power from the AC/DC adapter and supplying power to the primary smart battery or the secondary smart battery.

In order to achieve the above-mentioned objects, there is provided a second battery connection method of a portable computer system including connecting a primary smart battery to a secondary smart battery with a connector, checking whether there is the secondary smart battery according to a discharge state of the primary smart battery, selecting the primary or secondary smart battery connected with the connector and supplying power of the selected smart battery to each device of a system, checking an operation state or operation information of the smart batteries through a System Management BUS (SM BUS), requesting charge of the smart batteries by sensing an AC/DC adapter, and communicating periodically with the primary or secondary smart battery through the SM BUS by being supplied power from the AD/DC adapter and supplying power to the primary or secondary smart battery by corresponding to the information provided from them.

In order to achieve above-mentioned objects, in an AC/DC adapter including a rechargable smart battery, an AC/DC adapter in accordance with the present invention includes a smart battery supplying power to a portable computer system or supplying power to an inward battery of the portable computer system in order to charge it, an AC/DC converter being inputted AC power from a power source and outputting DC power appropriate for operating the portable computer system, and a charging circuit unit being inputted the DC power from the AC/DC converter and supplying power to the smart battery.

DETAILED DESCRIPTION OF THE PREFERRED EMBODIMENTS

Figure 1:
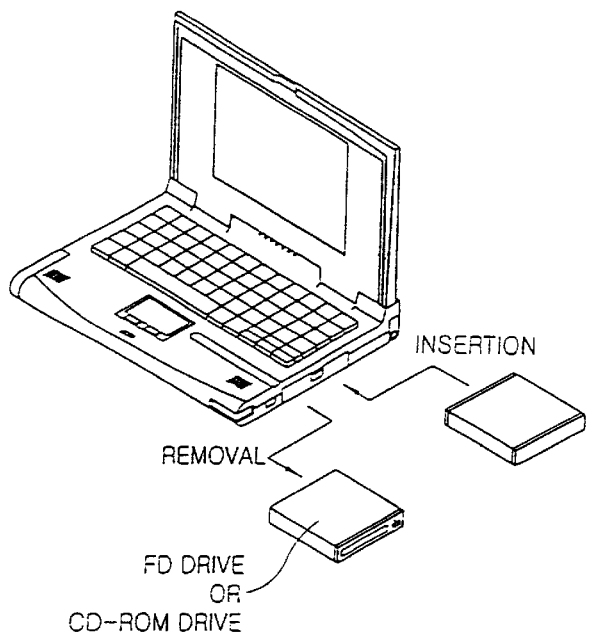
FIG. 1 is a perspective view which illustrates the changing of a battery in a portable computer system by a hot-plugging method in accordance with the prior art.
Figure 2:
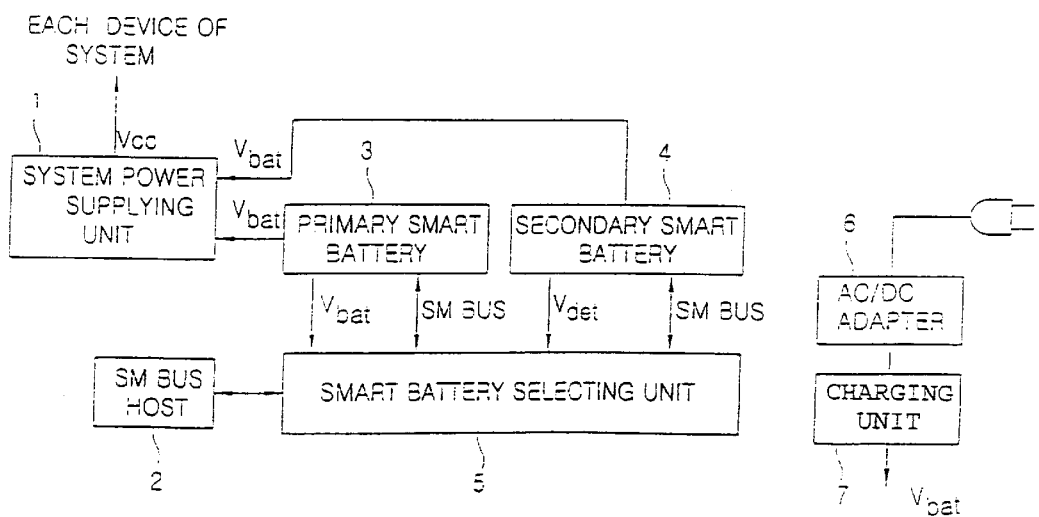
FIG. 2 is a schematic block diagram illustrating a method of using a secondary smart battery in a portable computer system in accordance with the prior art.
Figure 3A:
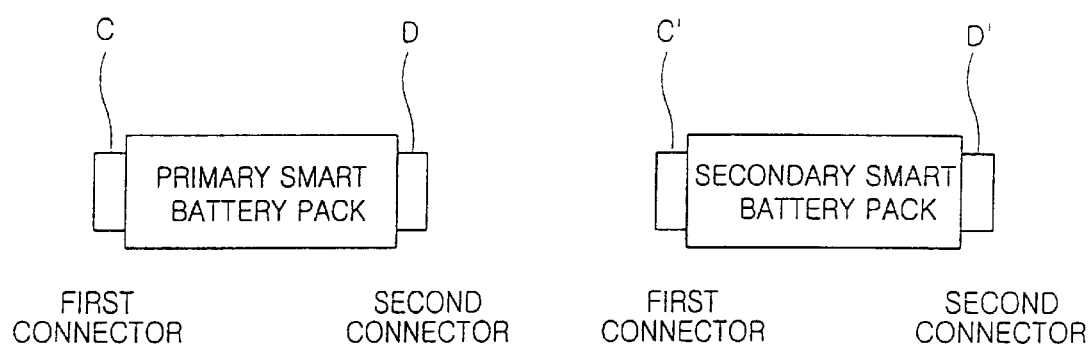
FIG. 3A is a plan view illustrating a primary smart battery and a secondary smart battery for a portable computer system in accordance with the present invention.
Figure 3B:
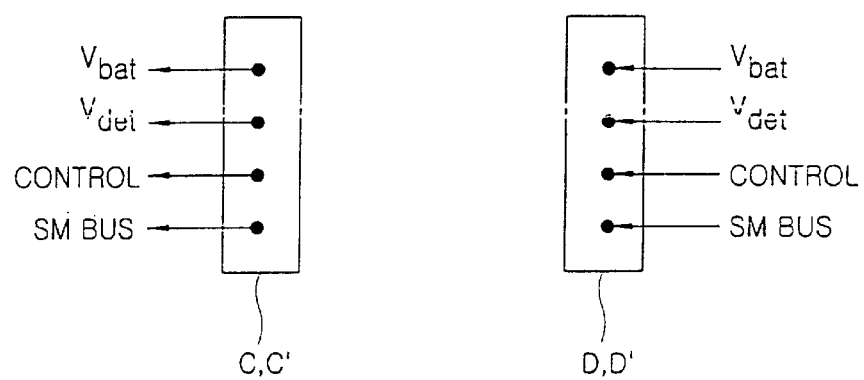
FIG. 3B is a schematic diagram illustrating first and second connectors of a primary and secondary smart battery in accordance with the present invention.

FIG. 3A is a plan view illustrating a primary smart battery and a secondary smart battery in accordance with the present invention for use with, for example, a portable computer system. The primary smart battery pack and the second smart battery pack each respectively includes one or more battery cells, a ROM(Read Only Memory) storing data relevant to the battery and the implementing of the relevant system management, a gauging IC, a peripheral circuit, and first connectors C, (C') and second connectors D, (D') installed at its exterior in order to permit connecting the secondary smart battery with the primary smart battery. Herein, as depicted in FIG. 3B, the first connectors C, (C') and the second connectors D, (D') are constructed with a plurality of pins for inputting/outputting a battery power signal $V_{bat}$, a battery connecting detecting signal $V_{det}$, a control signal and a SM BUS connection, respectively.

In more detail, the battery power signal $V_{bat}$ is a battery voltage path for charging and discharging, the battery connection detecting signal $V_{det}$ is for detecting the connection of a battery when the battery is connected to the portable system. In addition, the SM BUS (System Management BUS) is a protocol composed of data and clock signals and follows the SM BUS specification. Accordingly, when a battery is inserted into the portable computer system, a smart battery selecting unit or a battery control microcomputer can detect whether the battery is inserted by means of the battery connection detecting signal $V_{det}$. Particularly, by the plurality of pins, the portable computer system can detect whether the secondary smart battery is inserted by connecting the battery connection detecting signal $V_{det}$ from connector C' of the second smart battery pack to a control signal of the connector D of the primary smart battery pack.

Accordingly, when the gauging IC measuring factors such as a temperature of the battery cells, etc. monitors and stores various information (the temperature of the battery cells, the charge capacity, the remaining capacity of the battery, etc.) in its register space, the SM BUS (System Management BUS) host selects and reads the battery information of each battery by transmitting a command.

Figure 4:
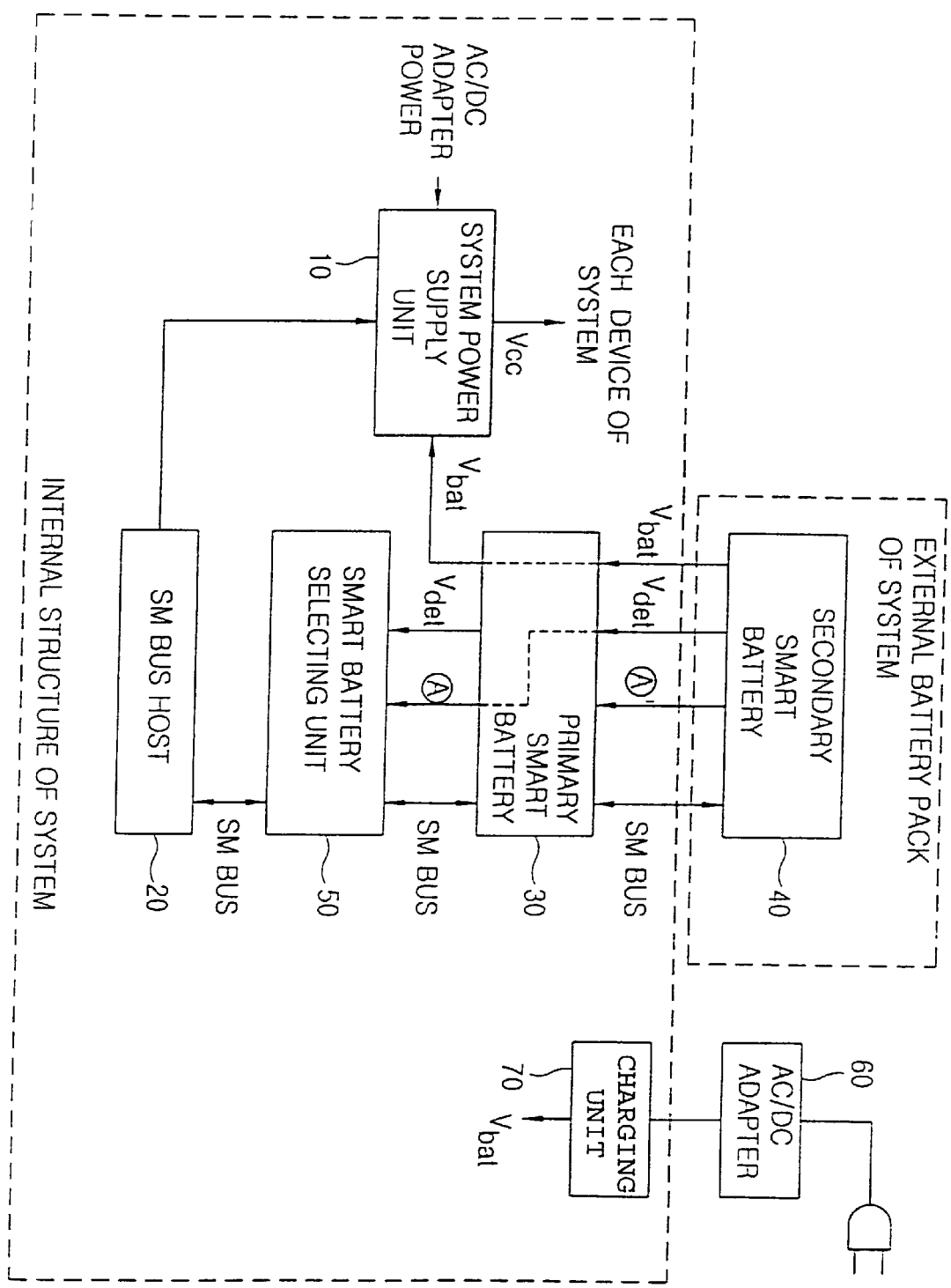
FIG. 4 is a schematic block diagram illustrating a secondary smart battery connection apparatus of a portable computer system in accordance with the present invention.

FIG. 4 is a schematic block diagram illustrating a secondary battery connection apparatus of a portable computer system in accordance with the present invention. As depicted in FIG. 4, a secondary battery connection apparatus of a portable computer system in accordance with the present invention includes a primary smart battery 30 and a secondary smart battery 40 each respectively having a first connector and a second connector provided at its exterior for connecting the secondary smart battery 40 to the primary smart battery 30, a smart battery selecting unit 50 selecting the primary smart battery 30 or the secondary smart battery 40 and controlling the selected battery so as to supply power to a portable computer system, a system power supply unit 10 being supplied with power from the primary smart battery 30 or secondary smart battery 40 selected by the smart battery selecting unit 50 and supplying power appropriate for operating the system, a SM BUS host 20 checking operation states or operation information of both smart batteries 30, 40 and state of each smart battery, an AC/DC adapter 60 being supplied with AC power from an external AC power source and outputting DC power, and a charging unit 70 being supplied with DC power from the AC/DC adapter 60 and supplying charging power to the primary smart battery 30 or the secondary smart battery 40.

The operation of the secondary battery connection apparatus of the portable computer system in accordance with the present invention will now be described.

First, in order to extend a use time of the portable computer system, the first connector C' of the secondary smart battery 40 is connected to the second connector D provided at the exterior of the primary smart battery 30. When the smart battery selecting unit 50 detects the secondary smart battery 40 by receiving the battery connection detecting signal $V_{det}$ from the secondary smart battery 40 through a control signal path(A) of the primary smart battery 30, the smart battery selecting unit 50 performs a communication through the SM BUS and controls the system so as to supply power to the system power supply unit 10. Herein, the smart battery selecting unit 50 can control the output of each battery voltage by transmitting a command through a communication with the primary and secondary smart batteries 30, 40. In addition, by embodying a switching unit (not shown) inside the portable computer system, by connecting the switching unit to each battery voltage $V_{BAT}$ pin of the primary and the secondary smart batteries 30, 40, an output voltage of the primary and the secondary batteries 30, 40 can be selected by a battery voltage selection control signal outputted from the smart battery selecting unit 50 of the portable computer system.

When the smart battery selecting unit 50 detects the battery connection detecting signal $V_{det}$ from the secondary smart battery 40, the smart battery selecting unit 50 transmits a battery output stop command to the internal circuit of the primary smart battery 30 and draws power from the secondary smart battery 40 to the system power supply unit 10. Herein, when the AC/DC adapter 60 is inserted, the SM BUS host 20 checks the operation state or operation information of the primary and secondary smart batteries 30, 40 through the SM BUS and requests the charge status of the primary and secondary smart batteries 30, 40.

In more detail, when the AC/DC adapter is inserted, the SM BUS host 20 outputs a power selection control signal to the system power supply unit 10 whereby the system power supply unit 10 supplies the DC output of the AC/DC adapter 60 to each device of the system, so that the DC output of the AC/DC adapter is supplied to the charging unit 70, and the primary and secondary smart batteries are charged respectively by the charge voltage $V_{bat}$.

Figure 5:
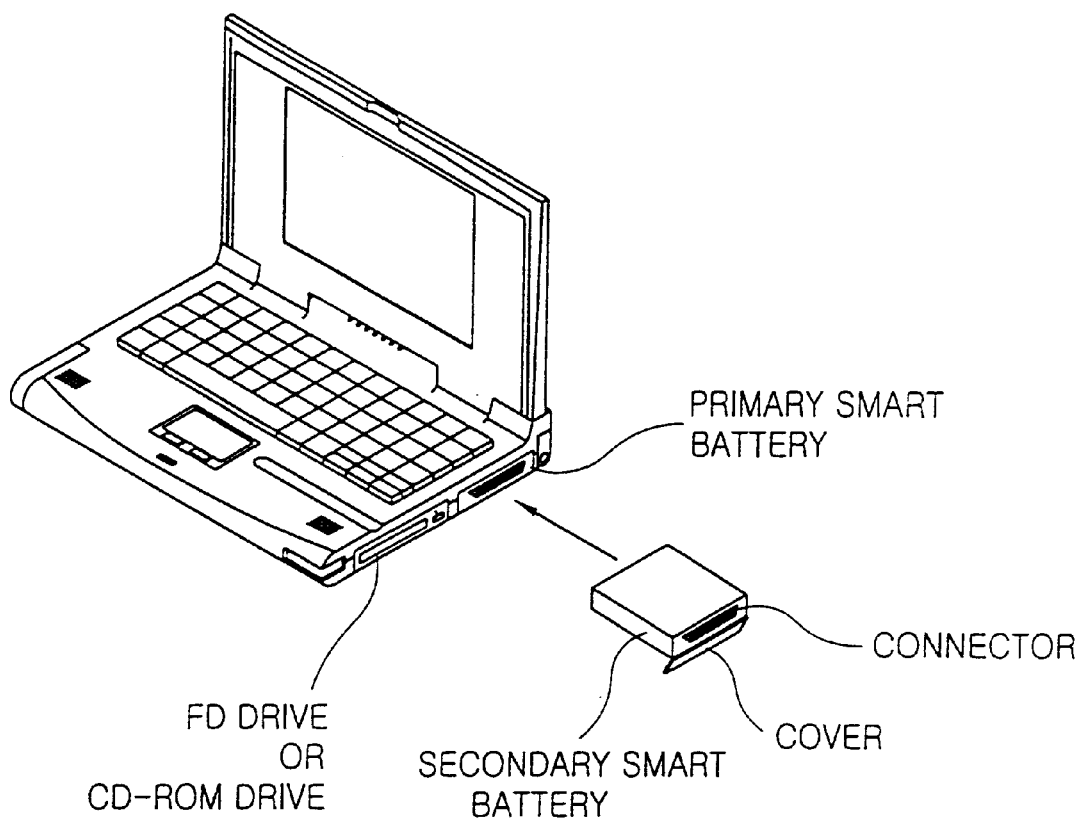
FIG. 5 is a perspective view illustrating a secondary smart battery connection apparatus of a portable computer system in accordance with the present invention.

Notably, in the prior art, the primary smart battery 30 and the secondary smart battery 40 are installed in the system in a parallel structure. That is, each connected to a separate power or multi-bay connector of the portable computer system. However, in the secondary battery connection apparatus of the portable computer system in accordance with the present invention, as depicted in FIG. 5, the secondary smart battery 40 is serially, that is, daisy-chain or piggy-back, connected to the primary smart battery 30, and the connection of multiple batteries to a single power bay or multi-bay connector of the portable computer system is possible by connecting the additional battery or batteries to the second connector at the exterior of the primary or the secondary smart batteries 30, 40. In addition, the internal circuits (SM BUS, $V_{det}$, etc.) of the primary smart battery 30 and the second smart battery 40 when so connected are coupled to each other, and a cover may be installed at the exterior of the smart battery in order to protect the connector pins. And, a battery separation lever (not shown) or similar mechanism may be additionally installed at the exterior of the battery in order to separate the battery easily with one hand. Accordingly, because the secondary smart battery 40 can be combined with the outward connector of the primary smart battery 30 even in a system operation state or a system standby mode of the portable computer system, the secondary battery connection apparatus for a portable computer system according to the present invention does not affect functions of a presently operating portable computer system and eliminates inconveniences due to a storage module change, the use of docking station or the use of port replicator, etc.

Figure 6:
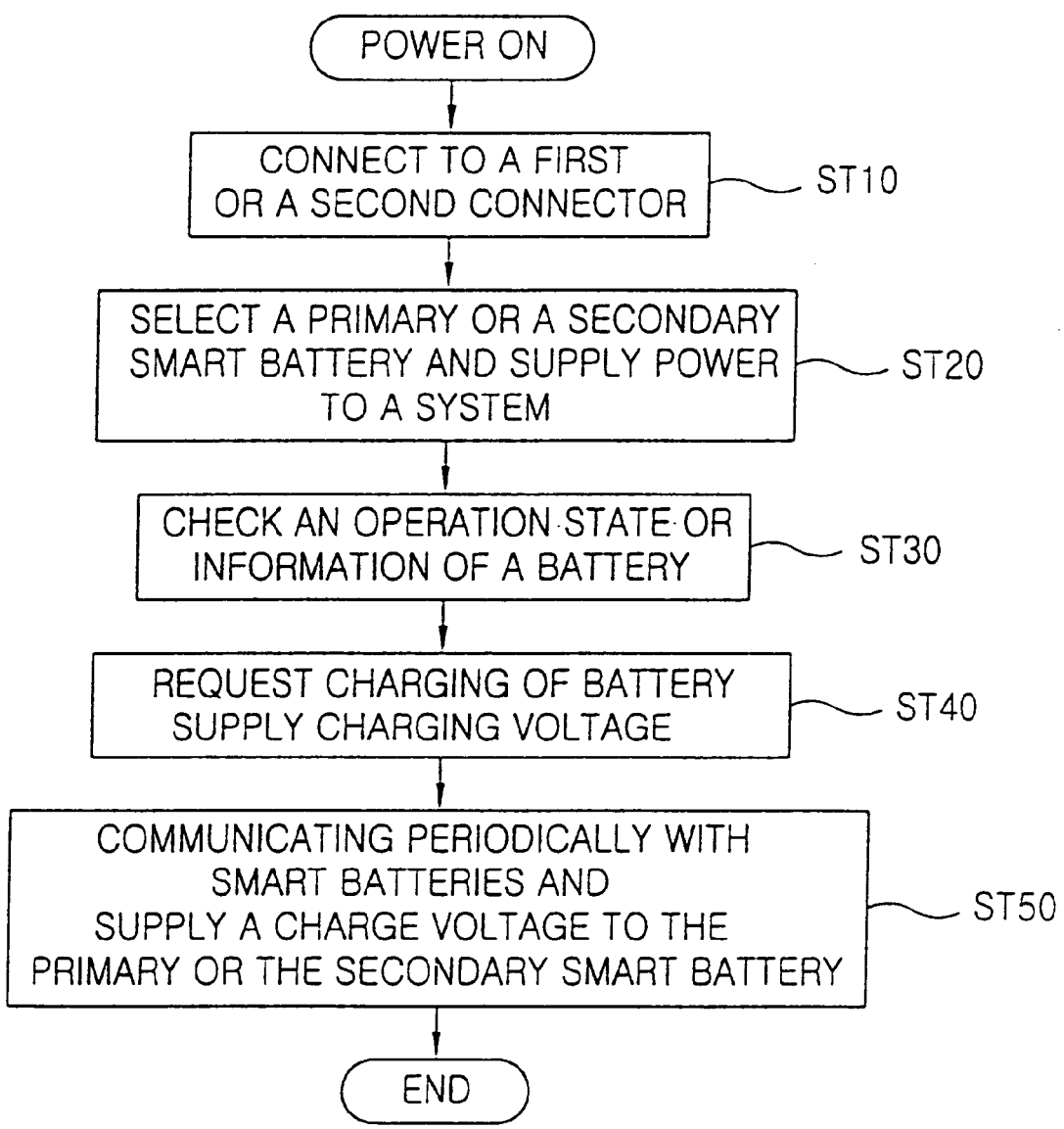
FIG. 6 is a flow chart illustrating a secondary smart battery connection method of a portable computer system in accordance with the present invention.

FIG. 6 is a flow chart illustrating a secondary battery connection method for a portable computer system in accordance with the present invention. As depicted in FIG. 6, when power of a portable computer system is ON and the portable computer system is operating, the secondary battery connection method for a portable computer system in accordance with the present invention includes a step of connecting the secondary smart battery 40 to the primary smart battery 30 using the connector as shown at ST10, a step of selecting the primary smart battery 30 or the secondary smart battery 40 connected with the connector in the smart battery selecting unit 50 and supplying power, as shown at ST20, a step of checking an operation state or operation information of the smart battery through the SM BUS, as shown at ST30, a step requesting a charge status of each smart battery when the AC/DC converter 60 is inserted, as shown at ST40, communicating periodically with the primary smart battery 30 or the secondary smart battery 40 through the SM BUS and a step of supplying a charging voltage to the primary smart battery 30 or the secondary smart battery 40 corresponding to the information provided from respective the smart battery, as shown at ST50.

In the meantime, instead of using the battery selecting unit 50 to implement the battery selection, a microcomputer can be used for battery control in the portable computer system.

Figure 7:
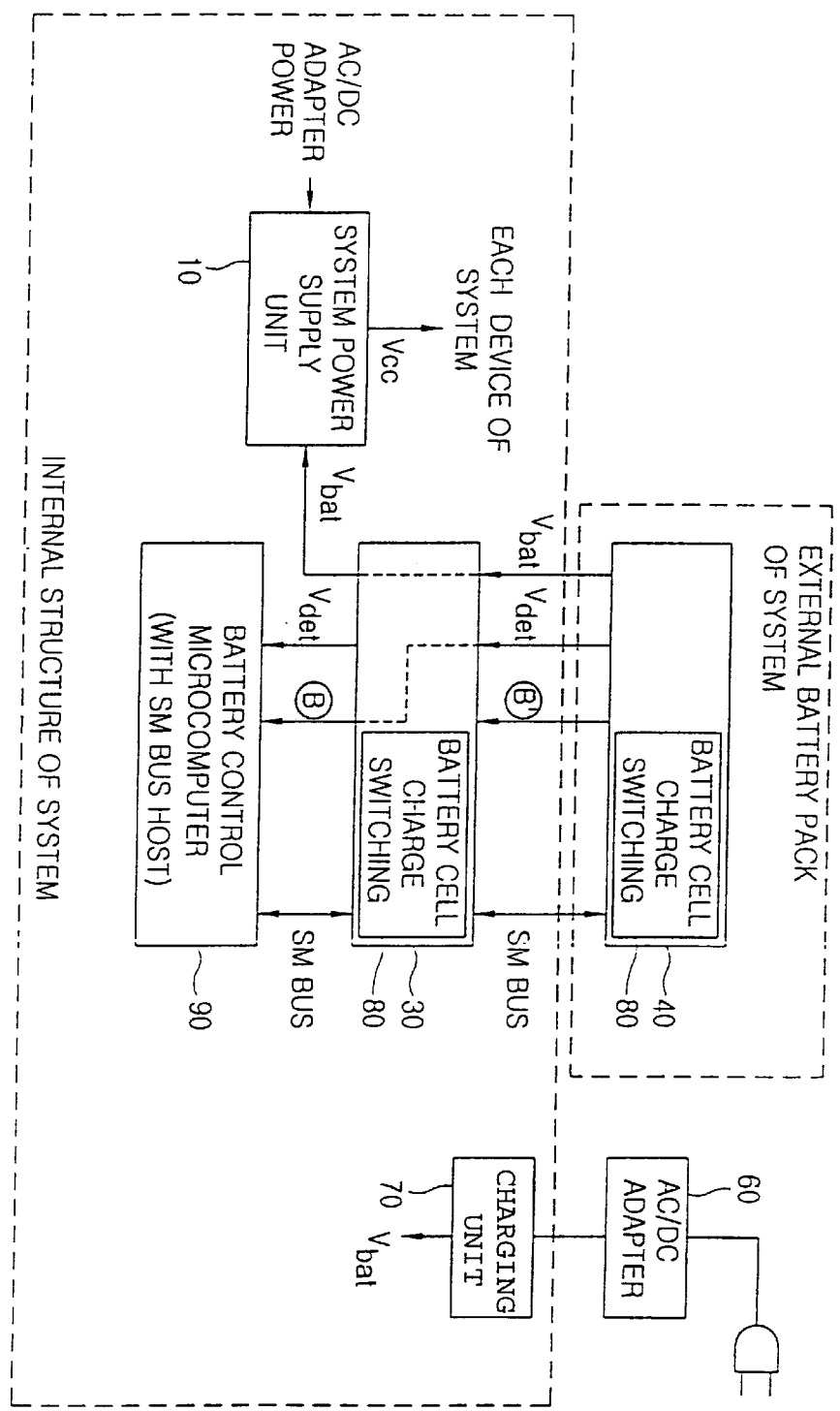
FIG. 7 is a schematic block diagram illustrating a secondary smart battery connection apparatus of a portable computer system without using a smart battery selecting unit in combination of a secondary smart battery with a primary smart battery in accordance with the present invention.

FIG. 7 is a block diagram illustrating another embodiment of a secondary battery connection apparatus for a portable computer system in accordance with the present invention which does not employ the smart battery selecting unit 50 in implementing the combination of the secondary smart battery 40 with the primary smart battery 30. As depicted in FIG. 7, the secondary battery connection apparatus for a portable computer system in accordance with this embodiment of the present invention, instead of using the smart battery selecting unit 50 includes, a battery control microcomputer 90 (e.g. an embedded controller serving as the SM BUS host) communicating with the primary and the secondary smart batteries 30, 40 having connectors at their exteriors through the SM BUS, and transmits commands thereto for determining the charge state of each battery. A battery cell charge switching unit 80 is installed inside each of the primary and secondary smart batteries 30, 40 and determines charge state of each battery through SM BUS communication with the battery control microcomputer 90, a system power supply unit 10 supplying power $V_{bat}$ appropriate for operating the system and receiving power from the primary and the secondary smart batteries 30, 40, an AC/DC adapter 60 being supplied AC power from an external AC power source and outputting DC power, and a charging unit 70 being supplied DC power from the AC/DC adapter 60 and supplying a charge voltage to the batteries.

The operation of the above-described embodiment of a secondary battery connection apparatus for a portable computer will now be described.

First, in order to extend the use time of the portable computer system, the first connector C' of secondary smart 40 is connected to the second connector D installed at the exterior of the primary smart battery 30 inserted in the portable computer. When the battery control microcomputer 90 detects the secondary smart battery by receiving a contact detecting signal $V_{det}$ from the secondary smart battery 40 through a control signal path B of the primary smart battery 30, it performs communication with the secondary smart battery 40 through the SM BUS and controls the secondary smart battery 40 so as to supply power to the system power supply unit 10. Herein, the battery control microcomputer 90 controls an output of each battery's voltage by transmitting a command through communication with the primary and the secondary smart batteries 30, 40. In addition, by embodying a switching unit (not shown) inside the portable computer system, and by selectively connecting the battery voltage $V_{BAT}$ connector pins of the primary and the secondary smart batteries 30, 40 to the system power supply unit 10 by operation of the switching unit, an output voltage of the primary and second smart batteries 30, 40 can be selected in accordance with a battery voltage selection control signal outputted from the battery control microcomputer 90 in the portable computer system.

When the battery control microcomputer 90 detects the battery connection detecting signal $V_{det}$ of the secondary smart battery 40, it transmits a battery output stop command to the internal circuit of the primary smart battery 30 via the SM BUS and controls the switching unit to supply power from the secondary smart battery 40 to the system power supply unit 10.

When the AC/DC adapter 60 is inserted, the battery control microcomputer 90 checks an operation state or operation information of the primary and secondary smart batteries 30, 40 through the SM BUS and whether a charging of the primary and secondary smart batteries 30, 40 is required.

And, when the AC/DC adapter 60 is inserted, the AC/DC adapter power is supplied to the system power supply unit 10 in accordance with a control signal from the battery control microcomputer 90 so as to supply power to each device of the system, whereby the DC output of the AC/DC adapter 60 is supplied to the charger unit 70, and accordingly charging of the primary and secondary smart batteries 30, 40 is performed by the charge voltage $V_{bat}$ supplied from the charger unit 70.

In more detail, when the AC/DC adapter 60 is inserted, the battery control microcomputer 90 transmits a primary smart battery charge command to a battery controller (not shown) through the SM BUS, whereby the battery controller related to a charge circuit inside the battery charges the primary smart battery 30 by controlling the battery cell charge switching unit 80 inside the primary smart battery 30, but on the contrary, when a secondary smart battery charge stop command is transmitted, the secondary smart battery 40 stops the charging by controlling the battery cell charge switching unit 80 inside the secondary smart battery for a "quick" charging, differently from the above-mentioned method, only the secondary smart battery can be charged.

Figure 8A:
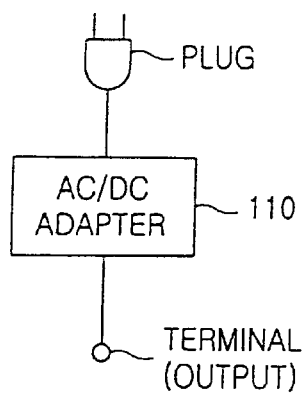
FIG. 8A is a block diagram illustrating an AC/DC adapter including an internal smart battery.
Figure 8B:
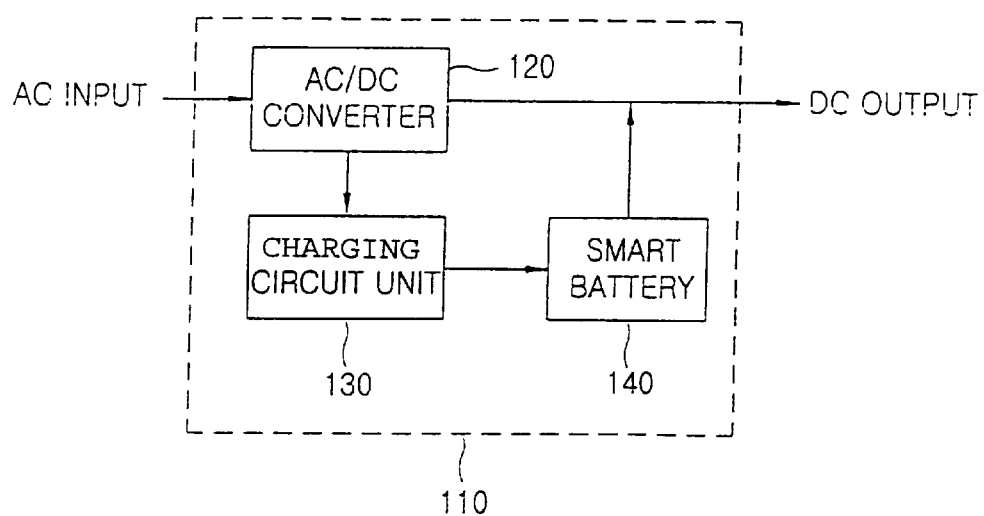
FIG. 8B is a schematic block diagram illustrating an AC/DC adapter including a rechargable internal smart battery in accordance with the present invention.

In accordance with another embodiment of the present invention, as depicted in FIG. 8A, a smart battery 140 can be installed inside an AC/DC adapter 110. FIG. 8B is a schematic block diagram illustrating the AC/DC adapter 110 installed inside of which is a rechargeable smart battery 140 in accordance with the present invention. As depicted in FIG. 8B, the AC/DC adapter 110 includes the smart battery 140 for supplying power to the portable computer system or supplying power to the internal battery of the portable computer system in order to charge it, an AC/DC converter 120 being supplied AC power from an external AC power source and outputting DC power appropriate for operating the portable computer system, and a charging circuit unit 130 being supplied DC power from the AC/DC converter and supplying it to the smart battery 140.

The operation of the AC/DC adapter 110 in accordance with the present invention will now be described.

First, the smart battery 140 inside the AC/DC adapter 110 is charged in advance by charger unit 130 with DC power converted by the AC/DC converter 120 from AC power supplied from an external AC power source. After that, when power of a basic (i.e., internal) battery of the portable computer system is less than a rated voltage, the portable computer user supplies power to the portable computer system by connecting the AC/DC adapter 110 including the smart battery 140 to the portable computer system and at the same time charges the battery inside the portable computer system.

In more detail, when the AC power is supplied to AC/DC adapter 110 connected to the portable computer system and the power capacity of the smart battery inside the portable computer system is less than a rated voltage, the portable computer user uses the AC/DC adapter 110 as a power source of the portable computer system and charges the smart battery inside the portable computer system.

In addition, when the AC/DC adapter 110 is not connected to an external AC power source, so that DC power from the AC/DC converter 120 is not supplied to the portable computer system and power output of the smart battery inside the portable computer system is less than the rated voltage, the user connects an output terminal of the AC/DC adapter 110 to the portable computer system, whereby the smart battery 140 inside the AC/DC adapter 110 is detected by the portable computer system, and thus supplies power from the smart battery 140 inside the AC/DC adapter 110 to the system power supply unit, whereby the portable computer system may continue to be operated.

Figure 9:
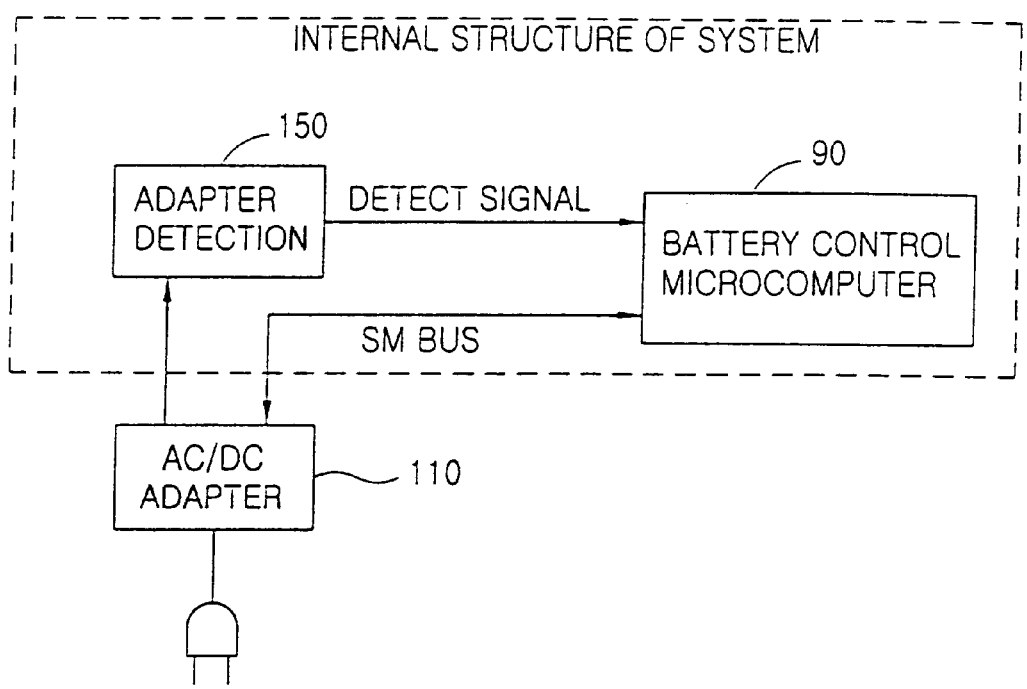
FIG. 9 is a schematic block diagram illustrating the connection scheme of an AC/DC adapter to computer system in case of being supplied with power from an external smart power source in accordance with the present invention.

FIG. 9 is a schematic block diagram illustrating the connection scheme of an AC/DC adapter to a portable computer system in accordance with the present invention. As depicted in FIG. 9, when the AC/DC adapter 110 is connected to the portable computer system and the plug of the AC/DC adapter 110 is connected to an external AC power source, an adapter detecting unit 150 contained within the portable computer system and to which a DC power output of the AC/DC adapter 110 is connected outputs a high detection signal to the battery control microcomputer 90 when power is supplied from the AC/DC adapter 110 to the portable computer system or a low detection signal when power is not supplied from the AC/DC adapter 110 to the portable computer system. And, the battery control microcomputer 90 receiving the high detection signal or the low detection signal routes DC power from the AC/DC adapter 101 to flow (in case of the high signal) to the system or routes power from the smart battery inside the AC/DC adapter 110 to flow (in case of the low signal) to the portable computer system. Accordingly, when power is supplied from the external AC power source to the AC/DC adapter 110, the battery control microcomputer 90 routes power from the AC/DC adapter 110 and uses the DC output power supplied from the AC/DC adapter 110, but when the plug of the AC/DC adapter 110 is disconnected from the external AC power source, the battery control microcomputer 90 performs communication with the AC/DC adapter 110 over the SM BUS and supplies DC output power from the smart battery inside the AC/DC adapter 110 to the portable computer system. Thus, SM bus signals are routed using the connecting cable of the AC/DC adapter.

As described above, the secondary battery connection apparatus for a portable computer, the connection method thereof and the AC adapter implementing same, in accordance with the present invention are capable of supplying power stably to a portable computer system by directly connecting a secondary smart battery to a primary smart battery through an exterior connector of the primary smart battery during system operation or in a standby mode without modifying a control structure of the portable computer system or using additional equipment such as a docking station or a port replicator, and of improving the reliability and stability of the product by minimizing the expense to a user and by not requiring a structural modification of the portable computer system.

What is claimed is:

1. In an apparatus for connecting a battery to a portable computer system, a secondary battery connection apparatus for a portable computer system, comprising:

a primary smart battery and a secondary smart battery each respectively having a first connector and a second connector installed at an exterior thereof for connecting the secondary smart battery to the primary smart battery;

a smart battery selecting unit for selecting the primary smart battery or the secondary smart battery and controlling the selected battery so as to supply power to a portable computer system;

a system power supply unit for being supplied power from the primary or secondary smart battery selected by the smart battery selecting unit and supplying power appropriate for operating the portable computer system;

a SM BUS (System Management Bus) host for checking operation states or operation information of both the primary and secondary smart batteries and requesting a charge state of each smart battery;

an AC/DC adapter for being supplied AC power from an external AC power source and outputting DC power; and a charging unit for being supplied the DC power from the AC/DC adapter and supplying changing power to the primary smart battery or the secondary smart battery.

2. The apparatus of claim 1, further comprising:

a cover provided in the portable computer system and openable when connecting a battery thereto in order to protect a plurality of internal pins of respective connectors thereof.

3. The apparatus of claim 1, wherein the first and second connectors of each smart battery is installed at a side thereof opposite to a side connectable to the portable computer system.

4. The apparatus of claim 1, further comprising:

a battery separation lever installed at an exterior of the secondary smart battery in order to facilitate separating the secondary smart battery from the primary smart battery.

5. The apparatus of claim 1, further comprising:

a plurality of first connector pins and a plurality of second connector pins separately installed at the respective corresponding first connector and the second connector of the primary and secondary smart batteries.

6. The apparatus of claim 5, wherein a detection signal from the first connector and a control signal from the second connector are internally connected in the primary smart battery or the secondary smart battery.

7. The apparatus of claim 1, wherein there is no change in functions of a presently operating portable computer system when the secondary smart battery is directly connected/separated to/from the second connector of a primary smart battery thereof during a system operation state or a standby state.

8. The apparatus of claim 1, wherein the primary smart battery is insertable into an internal space of the portable computer system and the secondary smart battery is connectable to the primary smart battery externally of the portable computer system.

9. In an apparatus for connecting a battery to a portable computer system, a secondary battery connection apparatus of a portable computer system, comprising:
   a primary smart battery and a secondary smart battery each respectively having a first connector and a second connector installed at an exterior thereof for connecting the secondary smart battery to the primary smart battery;
   a battery control microcomputer for outputting a battery selection signal after connecting the primary smart battery and the secondary smart battery and for selecting one of the smart batteries and for supplying power from the selected smart battery to the portable computer system; and
   a system power supply unit for being supplied power from the primary or the secondary smart battery selected by the battery control microcomputer and supplying power appropriate for operating the portable computer system.

10. The apparatus of claim 9, further comprising:
   a battery cell charge switching unit installed inside each of the smart batteries.

11. The apparatus of claim 10, wherein the battery cell charge switching unit determines a charge state of each of the smart batteries by performing communication with the battery control microcomputer through an SM BUS (System Management Bus) system of the portable computer system.

12. The apparatus of claim 9, wherein the battery control microcomputer controls a charging of each smart battery by performing communication with the primary or the secondary smart battery in accordance with connection of an AC adapter to the portable computer system.

13. The apparatus of claim 9, wherein the battery control microcomputer performs communication with the primary or the secondary smart battery through the SM BUS by a battery charge request of an SM BUS host, transmits a command for supplying a charging voltage to the primary or the secondary smart battery corresponding to information supplied from the respective smart battery, and controls a charge switching unit installed inside each of the smart batteries in order to control charging of each smart battery.

14. In a method for connecting a battery to a portable computer system, a secondary battery connection apparatus for a portable computer system, comprising:
   connecting a primary smart battery to a secondary smart battery through respective connectors on each smart battery;
   supplying power from one of the smart batteries selected by a smart battery selecting unit to a portable computer system;
   requesting a charge state of the primary or the secondary smart battery upon sensing connection of an AD/DC adapter to the portable computer system; and
   communicating periodically with the primary smart battery and the second smart battery through a SM BUS (System Management Bus) of the portable computer system and supplying a charging voltage to the primary or the secondary smart battery corresponding to information from the smart batteries.

15. The method of claim 14, wherein the requesting process comprises:
   transmitting a battery conversion command to an internal circuit of the primary smart battery and supplying power from the secondary smart battery to the portable computer system through an internal switching of the primary smart battery when the smart battery selecting unit senses the connection of the secondary smart battery to the primary smart battery.

16. The method of claim 14, wherein the charging voltage supplying process comprises:
   starting charging of the primary smart battery when a charging command is transmitted to the primary smart batter through the SM BUS; and
   stopping charging of the primary smart battery when a charge stop command is transmitted to the secondary smart battery.

17. In an apparatus for connecting a battery to a portable computer system, a secondary battery connection apparatus for a portable computer system, comprising:
   a primary smart battery and a secondary smart battery each respectively including a first and a second connector so as to enable connecting not less than one additional smart battery thereto a plurality of pins for inputting/outputting signals being provided each of the connectors; and
   a control unit controlling the supplying of an output voltage of the secondary smart battery to the portable computer system by sensing the secondary smart battery when the secondary smart battery is connected to the primary smart battery.

18. The apparatus of claim 17, wherein the plurality of pins of the first and the second connectors are $V_{det}$, $V_{bat}$, control, clock and data signal pins.

19. The apparatus of claim 17, wherein the $V_{det}$ signal pins and the control signal pins of the first connector and the second connector of each smart battery are internally connected.

20. The apparatus of claim 17, wherein the primary smart battery is installable inside the portable computer system, and the secondary smart battery is connectable to the primary smart battery externally of the portable computer system.

21. An AC/DC adapter for outputting DC power to a portable computer system, the AC/DC adapter comprising:
   a smart battery inside of the AC/DC adapter is configured to supply power to a portable computer system;
   an AC/DC converter is suppled with AC power from an AC power source and outputting DC power appropriate for operating the portable computer system; and
   a charging circuit unit is supplied with the DC power from the AC/DC converter and supplying charging power to the smart battery of the AC/DC adapter, wherein when the AC/DC converter is supplied with the AC power from the AC power source and a capacity of the smart battery or the portable computer internal smart battery is below a prescribed level, the AC/DC converter supplies power to charge the smart batteries, and wherein when the AC/DC converter is not supplied with power from the AC power source and the power capacity of the internal battery is below the prescribed level, the smart battery power provides power to the portable computer system.

22. The AC/DC adapter of claim 21, wherein the AC/DC adapter charges the smart battery of the AC/DC adapter upon being supplied with AC power from the AC power source.

23. The AC/DC adapter of claim 22, wherein a user of the portable computer system can supply operating power to the portable computer system and at the same time charge the smart battery inside the portable computer system by using the AC/DC adapter when AC power is supplied to the AC/DC adapter and power supplied to the portable computer system by the smart battery inside the portable computer system is less than a rated voltage.

24. The AC/DC adapter of claim 22, wherein when a user of the portable computer system connects an output terminal of the AC/DC adapter to the system, the portable computer system detects the smart battery of the AC/DC adapter and supplies power from the smart battery of the AC/DC adapter to the portable computer system when AC power is not supplied to the AC/DC adapter and when power supplied from the smart battery inside the portable computer system is less than a rated voltage.

25. The AC/DC adapter of claim 21, further comprising a DC output connected to an adapter detecting unit that outputs a signal having a first prescribed level when DC power is supplied from the AC/DC adapter to the portable computer system, and outputs a signal having a second prescribed level when power is not supplied from the AC/DC adapter to the portable computer system.

26. The AC/DC adapter of claim 21, further comprising a DC output connected to an adapter detecting unit that routes DC power from the AC/DC adapter to the portable computer system under control of a battery control microcomputer when a signal having a first prescribed level is detected, or routes DC power from the smart battery inside the AC/DC adapter to the portable computer system under control of the battery control microcomputer when a signal having a second prescribed level is detected.

27. A connection method of an AC/DC adapter to a portable computer system when the AC/DC adapter is supplied being AC power and is outputting DC power to operate the portable computer system, the AC/DC adapter connection method comprising:

outputting a signal having a first prescribed level from an adapter detecting unit when DC power is supplied from the AC/DC adapter to the portable computer system, and outputting a signal having a second prescribed level from the adapter detecting unit when power is not supplied from the AC/DC adapter to the portable computer system;

routing DC power to the portable computer system (in case of the first prescribed level signal) from the AC/DC adapter under control of a battery control microcomputer or routing power to the portable computer system from a smart battery (in case of the second prescribed level signal) inside the AC/DC adapter under control of the battery control microcomputer; and using the smart battery inside the AC/DC adapter as a power supply of the portable computer system while communicating with the AC/DC adapter when the AC/DC adapter is disconnected from an AC power source.

28. In a smart battery including a rechargeable electrical power source and internal circuitry for the communication of control and status data of the rechargeable electrical power source and having a first connector provided on an exterior of said smart battery for enabling said smart battery to be connected to other devices for supplying and/or receiving electrical power thereto and/or therefrom and for enabling communication of status and control data therewith, the smart battery comprising:

a second connector provided on the exterior of said smart battery, for connecting with the first connector of the second smart battery, said second connector of said smart battery routing electrical power and status and control data signals between said first connector of said smart battery and said first connector of said second smart battery when said second smart battery is connected to the second connector of said smart battery.

29. The smart battery according to claim 28, further comprising:

a switching circuit within said smart battery operable to selectively route to/from said first connector of said smart battery electrical power and status and control signaled from/to said smart battery and power and status and control signals from/to a second smart battery connected to said second connector of said smart battery.

30. The smart battery according to claim 28, wherein the first and second connectors are provided at opposite locations on an exterior of said smart battery.

31. A connection method of an AC/DC adapter and a portable computer system, comprising:

detecting a smart battery within an AC/DC adapter connected to a portable computer system;

communicating with the smart battery within the AC/DC adapter through a communication bus of the portable computer system; and providing a system power to the portable computer system from the smart battery within the AC/DC adapter when the AC/DC adapter does not receive power from an external power source.

32. The connection method of claim 31, comprising providing the system power from the AC/DC adapter to the portable computer system while communicating with the AC/DC adapter when the AC/DC adapter is connected to an AC power source.

* * * * *